United States Patent
Lee et al.

(10) Patent No.: US 8,766,785 B2
(45) Date of Patent: Jul. 1, 2014

(54) METHOD, DEVICE, AND SYSTEM FOR PROVIDING SENSORY INFORMATION AND SENSE

(75) Inventors: Moon-joo Lee, Gyeonggi-do (KR); Jun-ho Koh, Gyeonggi-do (KR); Yang-un Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 128 days.

(21) Appl. No.: 13/329,962

(22) Filed: Dec. 19, 2011

(65) Prior Publication Data

US 2012/0154132 A1 Jun. 21, 2012

(30) Foreign Application Priority Data

Dec. 21, 2010 (KR) .................. 10-2010-0131661

(51) Int. Cl.
*H04B 3/36* (2006.01)
*G08B 6/00* (2006.01)
*G06F 3/01* (2006.01)
*G06F 3/0346* (2013.01)

(52) U.S. Cl.
CPC ... *G08B 6/00* (2013.01); *G06F 3/016* (2013.01); *G06F 3/0346* (2013.01)
USPC .................................... 340/407.1; 345/156

(58) Field of Classification Search
CPC ........... G08B 6/00; G06F 3/016; G06F 3/011; G06F 3/0346; G06T 19/10
USPC .......... 340/407.1; 345/156–158, 419; 463/37; 715/757
See application file for complete search history.

(56) References Cited

U.S. PATENT DOCUMENTS

| | | | |
|---|---|---|---|
| 7,161,579 B2 | 1/2007 | Daniel | |
| 7,843,429 B2 * | 11/2010 | Pryor | 345/158 |
| 2005/0285844 A1 * | 12/2005 | Morita et al. | 345/156 |
| 2005/0285853 A1 * | 12/2005 | Morita et al. | 345/419 |
| 2007/0091063 A1 * | 4/2007 | Nakamura et al. | 345/156 |
| 2008/0068336 A1 | 3/2008 | Choi et al. | |

FOREIGN PATENT DOCUMENTS

| | | |
|---|---|---|
| JP | 2002-366271 | 12/2002 |
| JP | 2005-537596 | 12/2005 |
| KR | 1020050065197 | 6/2005 |
| KR | 1020080026002 | 3/2008 |

* cited by examiner

*Primary Examiner* — John A Tweel, Jr.
(74) *Attorney, Agent, or Firm* — The Farrell Law Firm, P.C.

(57) ABSTRACT

Provided is a method, a device, and a system, in which a sensor of a sense-providing device senses a motion of a sense-providing device, without using a plurality of cameras, to detect an object and provide sensory information.

25 Claims, 5 Drawing Sheets

METHOD, DEVICE, AND SYSTEM FOR PROVIDING SENSORY INFORMATION AND SENSE

PRIORITY

This application claims priority to Korean Patent Application No. 10-2010-0131661, filed on Dec. 21, 2010, in the Korean Intellectual Property Office, the contents of which are incorporated herein by reference.

BACKGROUND OF THE INVENTION

1. Field of the Invention

The present invention relates generally to a method, a device, and a system for providing sensory information and a sense, and more particularly, to a method, a device, and a system for detecting an object, based on information about a motion of a sense-providing device using a 4-dimensional (4D) technology, and providing a user with a sense corresponding to the object.

2. Description of the Related Art

It is known in the art to provide a plurality of cameras installed on a television, for detecting a tactile sense-providing device installed on fingers of a user, so as to determine whether the user touches a certain object on a screen of the television. Tactile information corresponding to the object on the screen is transmitted to the tactile sense-providing device installed on the fingers, so that the user can feel the object.

SUMMARY OF THE INVENTION

Accordingly, the present invention has been made to solve the problems in the prior art and an aspect of the present invention provides a method, a device, and a system, in which a sensor of a sense-providing device senses a motion of the sense-providing device, without using a plurality of cameras, to detect an object and provide sensory information.

According to an aspect of the present invention, there is provided a sensory information-providing method including receiving motion information about a motion of a sense-providing device, detecting an object corresponding to a position of the sense-providing device, from an image, based on the motion information, and providing the sense-providing device with sensory information corresponding to the detected object.

According to another aspect of the present invention, there is provided a sense-providing method including generating motion information about a motion of a device performing the sense-providing method; transmitting the generated motion information, receiving sensory information corresponding to an object corresponding to a position of the device, in an image, based on the motion information, and outputting a sense corresponding to the sensory information.

According to another aspect of the present invention, there is provided a sensory information-providing device including a receiver configured to receive motion information about a motion of a sense-providing device, an object detector configured to detect an object corresponding to a position of the sense-providing device, from an image, based on the motion information, a storage configured to store sensory information corresponding to the object, and a sensory information provider configured to provide the sensory information from the storage to the sense-providing device.

According to another aspect of the present invention, there is provided a sense-providing device including a motion information generator configured to generate motion information about a motion of the sense-providing device, a transmitter configured to transmit the generated motion information, a receiver configured to receive sensory information corresponding to an object corresponding to a position of the sense-providing device, in an image, based on the motion information, and a sense output configured to output a sense corresponding to the sensory information.

According to another aspect of the present invention, there is provided a sense-providing method including generating motion information about a motion of a sense-providing device, transmitting, by the sense-providing device, the motion information to a sensory information-providing device, detecting, by the sensory information-providing device, an object corresponding to a position of the sense-providing device, from an image, based on the motion information, transmitting, by the sensory information-providing device, sensory information corresponding to the detected object, to the sense-providing device, and outputting, by the sense-providing device, a sense corresponding to the transmitted sensory information.

According to another aspect of the present invention, there is provided a sense-providing system including a sensory information-providing device, and a sense-providing device, wherein the sensory information-providing device includes a receiver configured to receive motion information about a motion of the sense-providing device, an object detector configured to detect an object corresponding to a position of the sense-providing device, from an image, based on the motion information, a storage configured to store sensory information corresponding to the object; and a sensory information provider configured to provide the sensory information from the storage to the sense-providing device, wherein the sense-providing device includes a motion information generator configured to generate the motion information, a transmitter configured to transmit the generated motion information, a receiver configured to receive the sensory information, based on the motion information, and a sense output configured to output a sense corresponding to the sensory information.

BRIEF DESCRIPTION OF THE DRAWINGS

The above and other features and advantages of the present invention will become more apparent by describing, in detail, embodiments thereof with reference to the attached drawings in which.

DETAILED DESCRIPTION OF EMBODIMENTS OF THE INVENTION

Reference will now be made in detail to embodiments of the present invention with reference to the accompanying drawings. In addition, a detailed description of generally known functions and structures of the present invention will be omitted for the sake of clarity and conciseness.

A 4-D technology provides a user with stimuli such as physical effects, as well as stereoscopic 3-dimensional (3-D) images and sounds, so that the user can receive realistic impressions. Alternatively, the 4D technology can be achieved by adding physical effects to a 2-dimensional (2-D) image. Physical effects may be obtained using air, vibration, motion control, water, smell, and light. According to an embodiment of the present invention, a display device provides 3D images and tactile stimuli, but the present invention is not limited thereto.

Figure 1A:
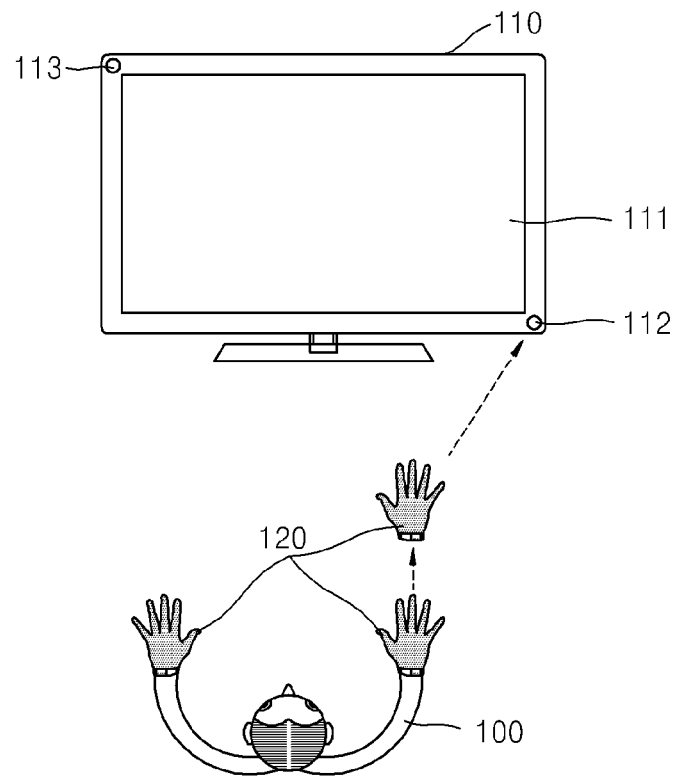
FIGS. 1A and 1B illustrate a sense-providing system according to an embodiment of the present invention.
Figure 1B:
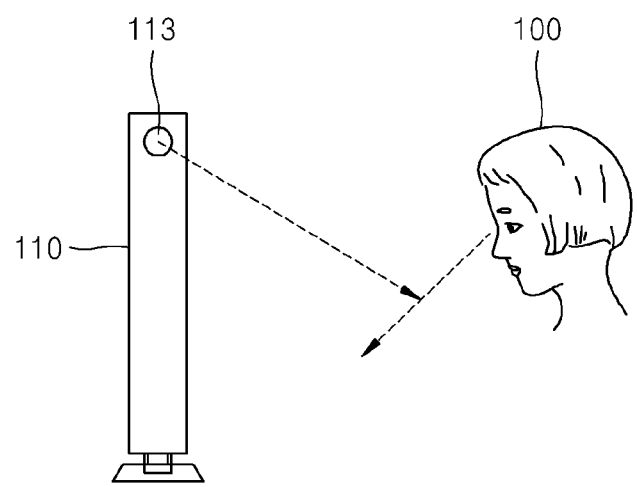

FIGS. 1A and 1B illustrate a sense-providing system according to an embodiment of the present invention.

Referring to FIG. 1A, the sense-providing system includes a sensory information-providing device and a sense-providing device that is provided to a user 100. A display device 110 as the sensory information-providing device includes a screen 111, a communication module 112 communicating with the sense-providing device, and a camera 113 for detecting a viewing direction of a user. A tactile device 120 as the sense-providing device provides tactile stimuli to the user 100, and includes a communication module communicating with the display device 110.

The tactile device 120 includes a sensor for detecting a motion of the tactile device 120, to generate motion information. The tactile device 120 then transmits the motion information to the display device 110. Based on the motion information, the display device 110 detects an object, which corresponds to a position of the tactile device 120, on the screen 111. The display device 110 then extracts tactile information corresponding to the detected object, and transmits the tactile information to the tactile device 120 through the communication module 112. The tactile device 120 outputs a tactile sense corresponding to the tactile information, to the user 100.

Referring to FIG. 1B, the camera 113 of the display device 110 detects viewing direction information about a viewing direction of the user 100. In FIG. 1B, the display device 110 detects an object based on the viewing direction information and motion information, unlike in FIG. 1A. Accordingly, the object can be more accurately detected.

Figure 2:
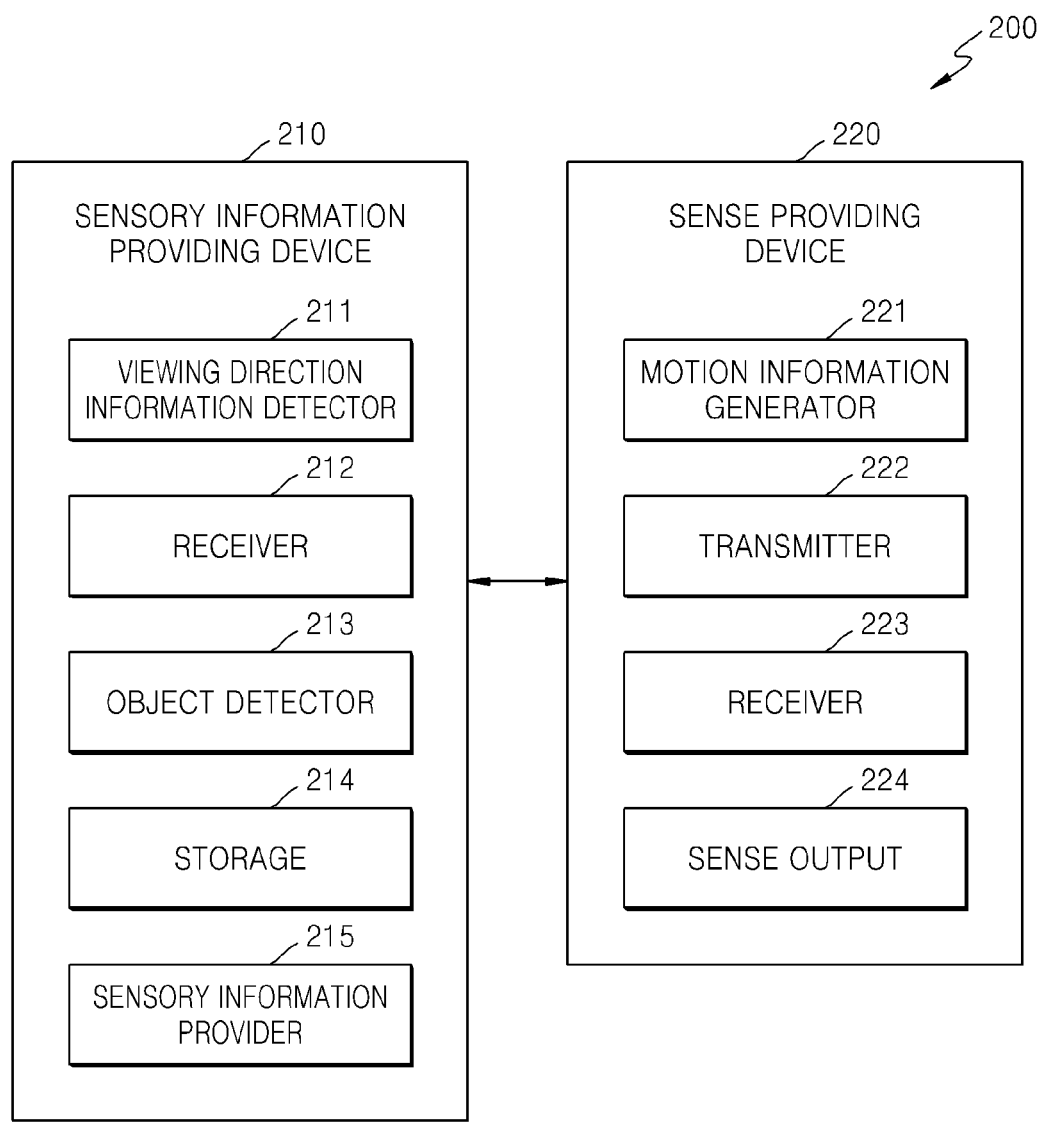
FIG. 2 illustrates a sense-providing system according to an embodiment of the present invention.

FIG. 2 illustrates a sense-providing system 200 according to an embodiment of the present invention.

The sense-providing system 200 includes a sensory information-providing device 210 and a sense-providing device 220. The sensory information-providing device 210 includes a viewing direction information detector 211, a receiver 212, an object detector 213, a storage 214, and a sensory information provider 215. The sense-providing device 220 includes a motion information generator 221, a transmitter 222, a receiver 223, and a sense output 224. The sensory information-providing device 210 may be provided to a display device (not shown) such as a television, but the present invention is not limited thereto. The sense-providing device 220 may be any device that is installed on a user's hand to provide various stimuli such as pressure, temperature, and vibration. The sense-providing device 220 may include a polymer glove. The receiver 212 and the sensory information provider 215 correspond to the communication module 112 of the sensory information-providing device of FIG. 1. The transmitter 222 and the receiver 223 correspond to the communication module of the sense-providing device of FIG. 1.

The viewing direction information detector 211 detects information about a viewing direction of a user. The viewing direction information detector 211 captures an eye of a user watching a display device including the sensory information-providing device 210, to sense an area at which the user stares on a screen of the display device, thereby detecting a viewing direction of the eye. The viewing direction information detector 211 may be a camera or a sensor for detecting information about a viewing direction.

The motion information generator 221 generates information about motions of the sense-providing device 220. For example, when the sense-providing device 220 installed on a user's hand approaches an object on the screen of the display device, the motion information generator 221 generates motion information such as moving direction and distance of the sense-providing device 220. The motion information generator 221 may include a geomagnetic sensor that analyzes flows of a magnetic field generated from the Earth to sense a compass direction, and an acceleration sensor that senses acceleration of a moving object. The motion information generator 221 uses a motion start signal as a reference to measure a motion. The sense-providing device 220 may receive the motion start signal from the sensory information-providing device 210, or may generate the motion start signal for itself. When the sense-providing device 220 receives or generates the motion start signal, the motion information generator 221 sets a position of the sense-providing device 220 as the motion start signal, and measures a motion of the sense-providing device 220 to generate motion information.

The transmitter 222 of the sense-providing device 220 transmits the generated motion information to the receiver 212 of the sensory information-providing device 210.

The object detector 213 detects an object corresponding to the position of the sense-providing device 220, from an image, based on the motion information received by the receiver 212 of the sensory information-providing device 210. The object detector 213 may measure a distance between a user and the display device by using information about a depth of an object in a 3D image. That is, the object detector 213 may detect a position of the sense-providing device 220, and an object corresponding to the position, based on motion information. When the viewing direction information detector 211 detects information about a viewing direction of a user, the object detector 213 may detect an object, based on the information and motion information. Due in part to the information about the viewing direction of the user, a position of the sense-providing device 220 is accurately detected.

The storage 214 stores sensory information corresponding to objects, such as tactile information. For example, when an object is ice, the storage 214 may store, in part, sensory information with respect to temperature.

The sensory information provider 215 reads sensory information corresponding to a detected object, from the storage 214, and transmits the sensory information to the receiver 223 of the sense-providing device 220.

The sense output 224 outputs a sense to a user on which the sense-providing device 220 is installed, based on sensory information received by the receiver 223 of the sense-providing device 220.

Figure 3:
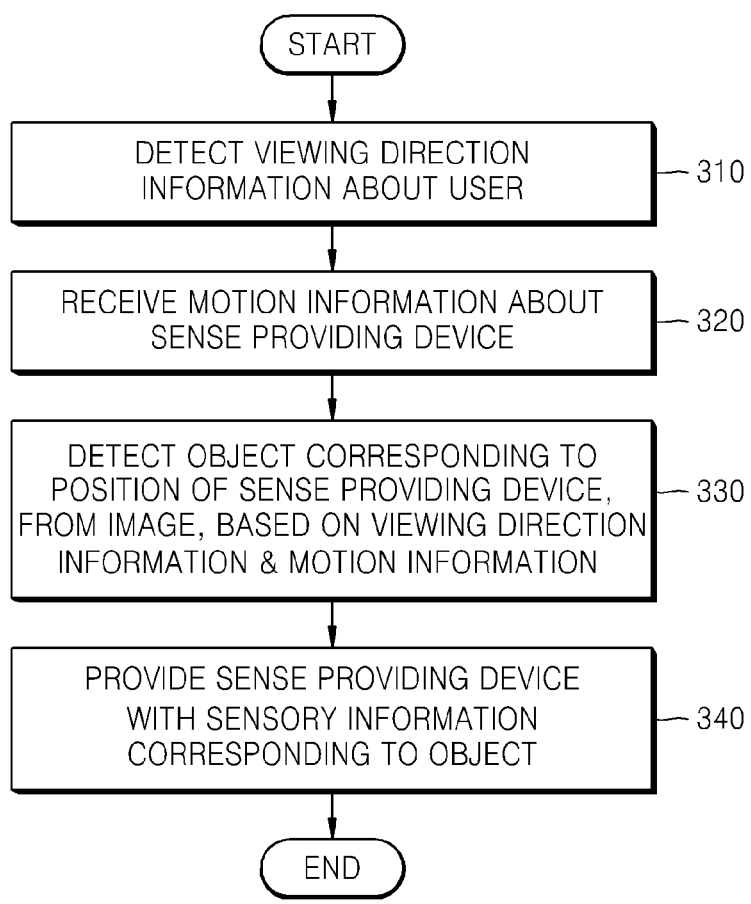
FIG. 3 illustrates a sensory information-providing method according to an embodiment of the present invention.

FIG. 3 illustrates a sensory information-providing method according to an embodiment of the present invention.

Referring to FIG. 3, in step 310, a sensory information-providing device detects viewing direction information about a viewing direction of a user. The sensory information-providing device captures an eye of the user watching a display device including the sensory information-providing device, to sense an area at which the user stares on a screen of the display device, thereby detecting a viewing direction of the eye. The sensory information-providing device detects the viewing direction information with a camera or a sensor for detecting information about a viewing direction. Alternatively, step 310 may be omitted.

In step 320, the sensory information-providing device receives motion information about a motion of a sense-providing device. Specifically, the sensory information-providing device receives information about a motion start position where the sense-providing device starts to move, and receives motion information from the motion start position. The motion information may be used to determine a distance between the sense-providing device and the screen of the display device, which will be described in detail with reference to FIG. 4.

In step 330, the sensory information-providing device detects an object corresponding to a position of the sense-providing device, from an image, based on the viewing direction information and the motion information. The sensory information-providing device may measure a distance between the user and the display device by using information about a depth of the object in a 3D image. That is, the sensory information-providing device may detect a current position of the sense-providing device and the object corresponding to the current position, based on the viewing direction information and the motion information. If step 310 is removed, the sensory information-providing device may detect the object, based on only the motion information.

In step 340, the sensory information-providing device transmits sensory information, stored in the sensory information-providing device and corresponding to the detected object, to the sense-providing device.

Figure 4:
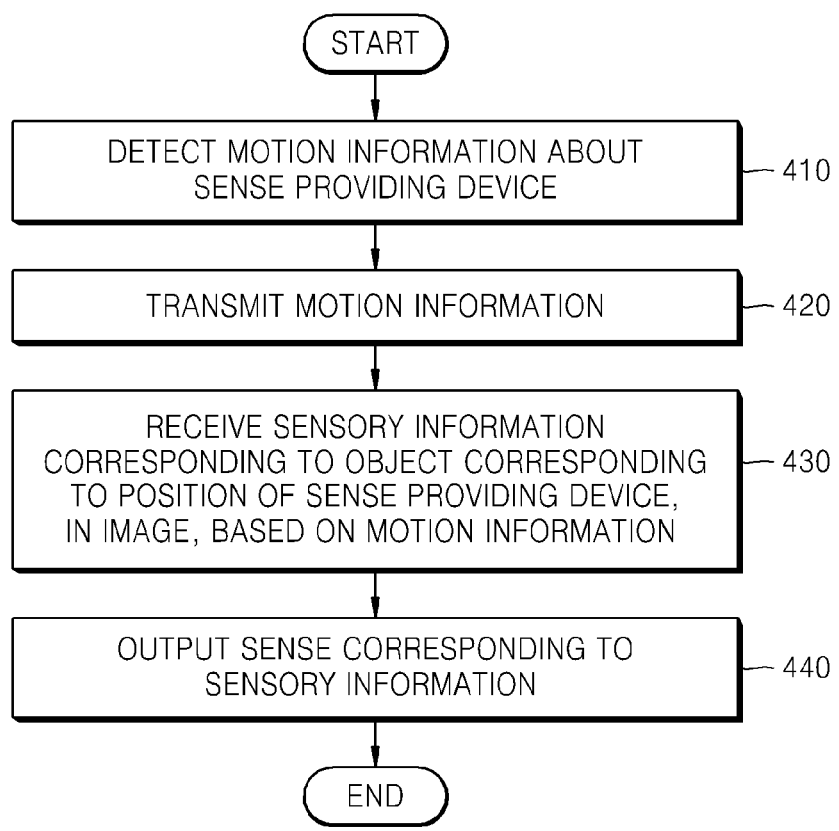
FIG. 4 illustrates a sense-providing method according to an embodiment of the present invention.

FIG. 4 illustrates a sense-providing method according to an embodiment of the present invention.

Referring to FIG. 4, in step 410, a sense-providing device generates motion information according to a motion of the device. For example, when the sense-providing device installed on a user's hand approaches an object on a screen of a display device, the sense-providing device generates motion information such as moving direction and distance of the sense-providing device. The sense-providing device may include a geomagnetic sensor that analyzes flows of a magnetic field generated from the Earth to sense a compass direction, and an acceleration sensor that senses acceleration of a moving object. The sense-providing device uses a motion start signal as a reference to measure a motion. The sense-providing device may receive the motion start signal from a sensory information-providing device, or may generate the motion start signal for itself. When the sense-providing device receives or generates the motion start signal, the sense-providing device sets a position of the sense-providing device as the motion start signal, and measures a motion of the sense-providing device to generate motion information.

In step 420, the sense-providing device transmits the generated motion information to the sensory information-providing device.

In step 430, the sense-providing device receives sensory information corresponding to an object corresponding to a position of the sense-providing device, in an image, based on the motion information. Since the object and the sensory information corresponding to the object in FIG. 4 are the same as those in FIG. 3, a description thereof will be omitted.

In step 440, the sense-providing device provides a user with a sense (e.g., a tactile sense such as pressure, temperature, and vibration) corresponding to the object.

Figure 5:
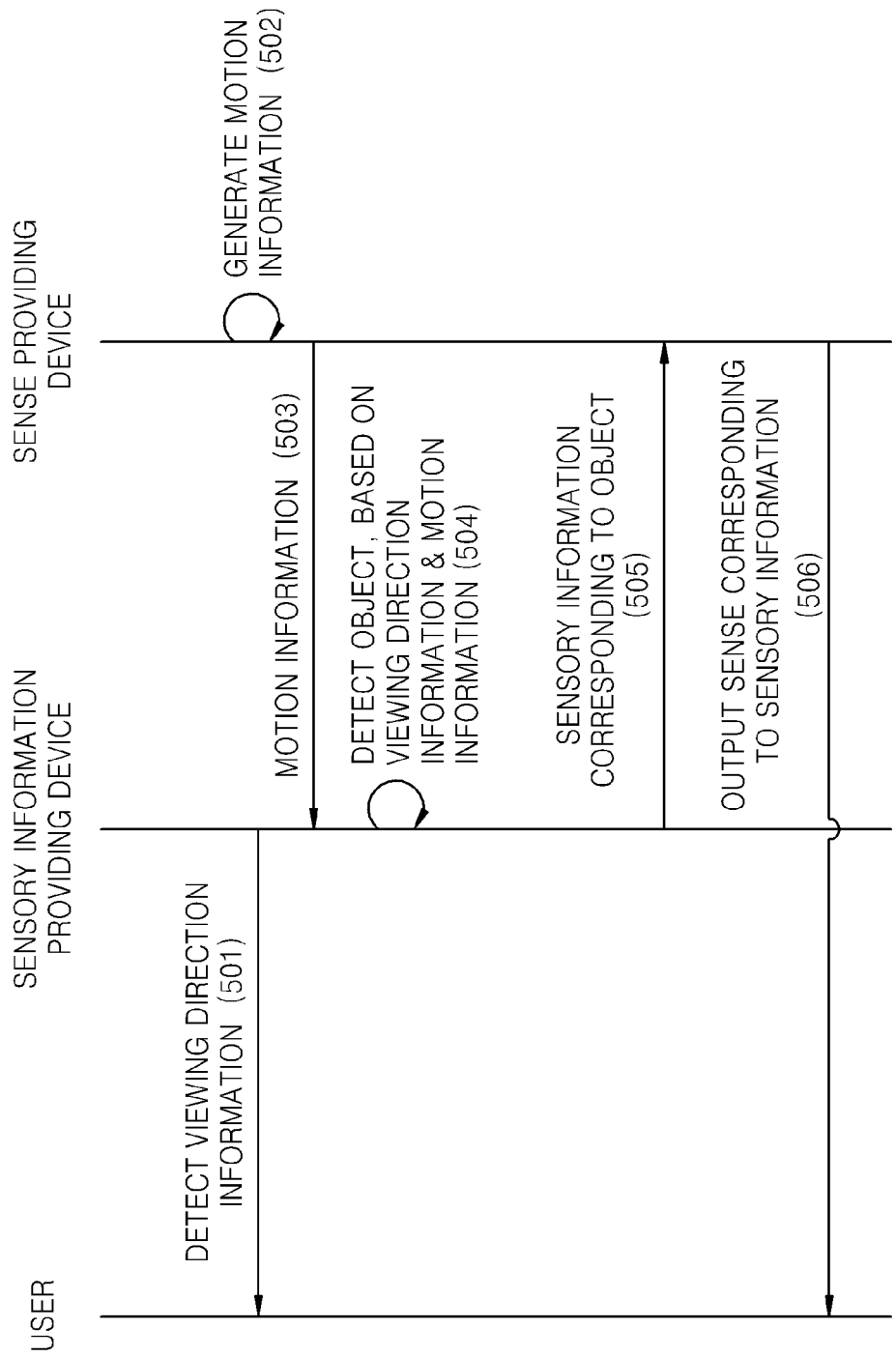
FIG. 5 illustrates a method of receiving sensory information from a sensory information-providing device and providing a sense from a sense-providing device, according to an embodiment of the present invention.

FIG. 5 illustrates a method of receiving sensory information from a sensory information-providing device and providing a sense from a sense-providing device, according to an embodiment of the present invention. Referring to FIG. 5, the methods of FIGS. 3 and 4 are illustrated with respect to a system. Since terms and processes in FIG. 5 are the same as those in FIGS. 3 and 4, a description thereof will be omitted.

In step 501, a sensory information-providing device detects viewing direction information about a viewing direction of a user.

In step 502, a sense-providing device generates motion information according to a motion of the device, by using at least one of a geomagnetic sensor and an acceleration sensor, which constitute the sense-providing device. The sense-providing device may include a polymer glove.

In step 503, the sense-providing device transmits the motion information to the sensory information-providing device.

In step 504, the sensory information-providing device detects an object corresponding to a position of the sense-providing device, from an image, based on the viewing direction information and the motion information from the sense-providing device. If step 501 is omitted, the sensory information-providing device detects the object, based on only the motion information.

In step 505, the sensory information-providing device transmits sensory information corresponding to the detected object, to the sense-providing device.

In step 506, the sense-providing device provides a user with a sense corresponding to the transmitted sensory information.

As described above, the sensory information-providing method, the sense-providing method, and the method of receiving sensory information from the sensory information-providing device and providing a sense from the sense-providing device may be realized with computer readable codes on a computer readable recording medium. The computer readable recording medium is any data storage device that can store data which can be thereafter read by a computer system. Examples of the computer readable recording medium include Read-Only Memory (ROM), Random Access Memory (RAM), Compact Disc-ROM (CD-ROM), magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to embodiments thereof, it will be understood by those of ordinary skill in the art that various changes in form and details may be made therein without departing from the spirit and scope of the present invention as defined by the following claims. The embodiments herein should be considered in descriptive sense only, and not for purposes of limitation. Therefore, the scope of the present invention is defined not by the detailed description of the present invention but by the following claims, and all differences within the scope will be construed as being included in the present invention.

What is claimed is:

1. A sensory information-providing method comprising:
   receiving motion information about a motion of a sense-providing device by:
      receiving motion start position information about a position where the sense-providing device starts to move; and
      receiving the motion information from the position where the sense-providing device starts to move;
   detecting, from an image, an object corresponding to a position of the sense-providing device, based on the motion information; and providing the sense-providing device with sensory information representing at least one property of the detected object.

2. The method of claim 1, further comprising detecting viewing direction information about a viewing direction of a user,
wherein the object is detected corresponding to the position of the sense-providing device, from the image, based on the motion information and the viewing direction information.

3. The method of claim 2, wherein the viewing direction information is detected from an imaging device constituting a device performing the sensory information-providing method.

4. A sense-providing method comprising:
generating, by a sensor, motion information about a motion of a device performing the sense-providing method by:
generating motion start position information about a position where the sense-providing device starts to move; and
generating the motion information from the position where the sense-providing device starts to move;
transmitting the generated motion information;
receiving sensory information representing at least one property of an object corresponding to a position of the device, in an image, based on the motion information; and
outputting a sense corresponding to the sensory information.

5. The method of claim 4, wherein the sensor generating the motion information is at least one of a geomagnetic sensor and an acceleration sensor.

6. The method of claim 4, wherein the device performing the sense-providing method comprises a polymer glove.

7. A sensory information-providing device comprising:
a receiver configured to receive motion information about a motion of a sense-providing device, wherein the receiver is configured to receive motion start position information about a position where the sense-providing device starts to move, and the motion information from the position where the sense-providing device starts to move;
an object detector configured to detect, from an image, an object corresponding to a position of the sense-providing device, based on the motion information;
a storage configured to store sensory information representing at least one property of the object; and
a sensory information provider configured to provide the sensory information from the storage to the sense-providing device.

8. The sensory information-providing device of claim 7, further comprising a viewing direction information detector configured to detect viewing direction information about a viewing direction of a user,
wherein the object detector detects the object corresponding to the position of the sense-providing device, from the image, based on the motion information and the viewing direction information.

9. The sensory information-providing device of claim 8, wherein the viewing direction information detector comprises an imaging device.

10. A sense-providing device comprising:
a motion information generator configured to generate motion information about a motion of the sense-providing device, wherein the generator is configured to generate motion start position information about a position where the sense-providing device starts to move, and the motion information from the position where the sense-providing device starts to move;
a transmitter configured to transmit the generated motion information;
a receiver configured to receive sensory information representing at least one property of an object corresponding to a position of the sense-providing device, in an image, based on the motion information; and
a sense output device configured to output a sense corresponding to the sensory information.

11. The sense-providing device of claim 10, wherein the motion information generator comprises at least one of a geomagnetic sensor and an acceleration sensor.

12. The sense-providing device claim 10, wherein the sense output device comprises a polymer glove.

13. A sense-providing method comprising:
generating motion information about a motion of a sense-providing device;
transmitting, by the sense-providing device, the motion information to a sensory information-providing device by:
transmitting, motion start position information about a position where the sense-providing device starts to move; and
transmitting, the motion information from the position where the sense-providing device starts to move;
detecting, from an image, by the sensory information-providing device, an object corresponding to a position of the sense-providing device, based on the motion information;
transmitting, by the sensory information-providing device, sensory information representing at least one property of the detected object, to the sense-providing device; and
outputting, by the sense-providing device, a sense corresponding to the transmitted sensory information.

14. The method of claim 13, further comprising detecting, by the sensory information-providing device, viewing direction information about a viewing direction of a user,
wherein detecting the object comprises detecting, by the sensory information-providing device, the object corresponding to the position of the sense-providing device, from the image, based on the motion information and the viewing direction information.

15. The method of claim 14, wherein detecting the viewing direction information comprises detecting, by the sensory information-providing device, the viewing direction information from an imaging device.

16. The method of claim 13, wherein the motion information is generated by at least one of a geomagnetic sensor and an acceleration sensor.

17. The method of claim 13, wherein the sense-providing device comprises a polymer glove.

18. A sense-providing system comprising:
a sensory information-providing device; and
a sense-providing device,
wherein the sensory information-providing device comprises:
a receiver configured to receive motion information about a motion of the sense-providing device, wherein the receiver receives the motion start position information and the motion information from the position where the sense-providing device starts to move;
an object detector configured to detect, from an image, an object corresponding to a position of the sense-providing device, based on the motion information;

a storage configured to store sensory information representing at least one property of the object; and a sensory information provider configured to provide the sensory information from the storage to the sense-providing device, wherein the sense-providing device comprises:
- a motion information generator configured to generate the motion information;
- a transmitter configured to transmit the generated motion information;
- a receiver configured to receive the sensory information, based on the motion information; and
- a sense output device configured to output a sense corresponding to the sensory information.

19. The system of claim 18, wherein the sensory information-providing device further comprises a viewing direction information detector configured to detect viewing direction information about a viewing direction of a user, wherein the object detector detects the object corresponding to the position of the sense-providing device, from the image, based on the motion information and the viewing direction information.

20. The system of claim 19, wherein the viewing direction information detector comprises an imaging device.

21. The system of claim 18, wherein the motion information generator comprises at least one of a geomagnetic sensor and an acceleration sensor.

22. The system of claim 18, wherein the sense output device comprises a polymer glove.

23. A computer readable recording medium having recorded thereon a computer program for executing a method for performing a sensory information-providing method comprising:

receiving motion information about a motion of a sense-providing device by:
- receiving motion start position information about a position where the sense-providing device starts to move; and
- receiving the motion information from the position where the sense-providing device starts to move;

detecting, from an image, an object corresponding to a position of the sense-providing device, based on the motion information; and providing the sense-providing device with sensory information representing at least one property of the detected object.

24. A computer readable recording medium having recorded thereon a computer program for executing a method for performing a sense-providing method comprising:

generating motion information about a motion of a device performing the sense-providing method by:
- generating, motion start position information about a position where the sense-providing device starts to move; and
- generating, the motion information from the position where the sense-providing device starts to move;

transmitting, by a sensor, the generated motion information;

receiving sensory information representing at least one property of an object corresponding to a position of the device, in an image, based on the motion information; and outputting a sense corresponding to the sensory information.

25. A computer readable recording medium having recorded thereon a computer program for executing a method for performing a sense-providing method comprising:

generating motion information about a motion of a sense-providing device by:
- generating, motion start position information about a position where the sense-providing device starts to move; and
- generating, the motion information from the position where the sense-providing device starts to move;

transmitting, by the sense-providing device, the motion information to a sensory information-providing device;

detecting, by the sensory information-providing device, an object corresponding to a position of the sense-providing device, from an image, based on the motion information;

transmitting, by the sensory information-providing device, sensory information representing at least one property of the detected object, to the sense-providing device; and outputting, by the sense-providing device, a sense corresponding to the transmitted sensory information.

* * * * *